United States Patent Office 2,849,435
Patented Aug. 26, 1958

2,849,435
ORTHO:ORTHO'-DIHYDROXY - AZO - DYESTUFFS AND COMPLEX METAL COMPOUNDS THEREOF

Walter Hanhart, Riehen, Switzerland, assignor to Ciba Limited, Basel, Switzerland, a Swiss firm No Drawing. Application April 7, 1955
Serial No. 500,015

Claims priority, application Switzerland April 14, 1954

8 Claims. (Cl. 260—145)

This invention provides new ortho:ortho'-dihydroxy-azo-dyestuffs which like, for example, the dyestuff of the constitution (1)

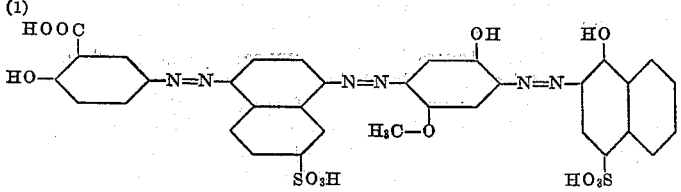

correspond to the general formula (2) $R_1-N=N-R_2-N=N-R_3-N=N-R_4$ in which $R_1$ represents a benzene radical containing in para-position to the azo linkage a hydroxyl group and in ortho-position to the latter group a carboxylic acid group, $R_2$ represents a naphthalene radical bound in para-position to the azo linkages, $R_3$ represents a benzene radical bound in para-position to the azo linkages and containing in ortho-position to the —N=N—$R_4$ group a hydroxyl group, and $R_4$ represents a naphthalene radical containing in a position vicinal to the azolinkage a hydroxyl group as the sole auxochromic group and also containing at least one sulfonic acid group.

The invention also includes ortho:ortho'-dihydroxy-azo-metal complexes of these dyestuffs containing a single metal atom bound in complex union per molecule of dyestuff, for example, the cupriferous dyestuff of the constitution (3)

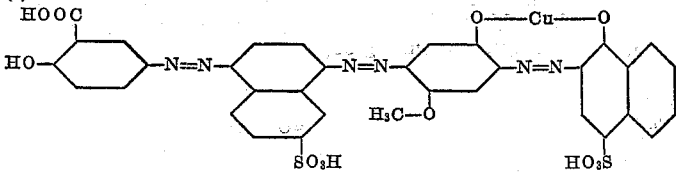

The invention also provides a process for the manufacture of dyestuffs of the above formula (2) and complex metal compounds thereof, wherein a dyestuff of the formula (4) $R_1-N=N-R_2-N=N-R_3-N=N-R_4$ in which $R_1$ represents a benzene radical radical containing in para-position to the azo linkage a hydroxyl group and in ortho-position to the latter group a carboxylic acid group, $R_2$ represents a naphthalene radical bound in para-position to the azo linkages, $R_3$ represents a benzene radical bound in para-position to the azo linkages and containing in ortho-position to the —N=N—$R_4$ group an alkoxy group, and $R_4$ represents a naphthalene radical containing in a position vicinal to the azo linkage a hydroxyl group as the sole auxochromic group and also containing at least one sulfonic acid group is treated to convert at least the ortho-hydroxy-ortho'-alkoxy-grouping into the ortho:ortho'-dihydroxy-azo-metal complex and, if desired, the complex metal compound so obtained is demetallized, and wherein, if the ortho-hydroxy carboxylic acid grouping of the radical $R_1$ has been metallized, the metal bound in complex union is removed therefrom.

The dyestuffs of the Formula 4 containing an ortho-hydroxy-ortho'-alkoxy-azo-grouping are advantageously prepared by coupling a diazo compound of a 1-amino-4-hydroxy-benzene-3-carboxylic acid ($R_1$—$NH_2$) with a 1-amino-naphthalene (H—$R_2$—$NH_2$) capable of coupling in the 4-position, diazotizing the resulting amino-monoazo-dyestuff of the formula (5) $R_1-N=N-R_2-NH_2$ coupling the diazo compound with a 1-amino-2-alkoxy-benzene (H—$R_3$—$NH_2$), diazotizing the amino-disazo-dyestuff so obtained, and coupling the diazo-compound with a hydroxynaphthalene sulfonic acid (H—$R_4$) capable of coupling in a position vicinal to the hydroxyl group and containing no other auxochromic groups.

As initial components of the formula $R_1$—$NH_2$, there may be used, for example, 1-amino-5-chloro-4-hydroxy-benzene-3-carboxylic acid or advantageously 1-amino-4-hydroxybenzene-3-carboxylic acid, and the diazo-compound obtainable therefrom is coupled, for example, with 1-aminonaphthalene or 1-aminonaphthalene-6- or 7-sulfonic acid or a mixture of these two acids.

As second middle components of the formula H—$R_3$—$NH_2$ there are advantageously used 1-amino-2-alkoxy-benzenes having an alkoxy group of low molecular weight, for example, an ethoxy or more especially a methoxy group. As examples there may be mentioned 1-amino-2-methoxybenzene, 1-amino-2-ethoxybenzene, 1-amino-2-methoxy-5-methyl-benzene and 1-amino-2:5 - dimethoxybenzene.

The diazo compounds of the resulting amino-disazo-dyestuffs of the formula (6) $R_1-N=N-R_2-N=N-R_3-NH_2$ are then coupled with the end components of the formula H—$R_4$. The latter components contain as a single auxochromic group a hydroxyl group and therefore contain no primary amino groups or amino groups substituted at the nitrogen atom. In addition to the hydroxyl group they must contain as a further substituent at least one sulfonic acid group, and the position of the substituents must be such that coupling takes place in a position vicinal to the hydroxyl group. As end components there may be used, for example, 1-hydroxynaphthalene-4- or -5-sulfonic acid, 2-hydroxynaphthalene-5- or -6- or -7-sulfonic acide, 1-hydroxynaphthalene-3:6- or -3:8-disulfonic acid, 2-hydroxy-naphthalene-3:6-disulfonic acid or 1-hydroxy-8-chloronaphthalene-3:6-disulfonic acid.

The components are advantageously so chosen that the dyestuff molecule contains two sulfonic acid groups. As end components there come into consideration hydroxynaphthalene mono- and di-sulfonic acids of the formula

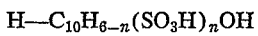

in which $n$ is a whole number not greater than 2. As first middle components of the formula H—R₁—NH₂ there come into consideration more especially aminonaphthalene sulfonic acids of the constitution

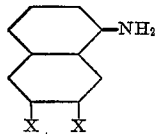

in which one X represents a hydrogen atom and the other X a sulfonic acid group.

The ortho-hydroxy-ortho'-alkoxy-azo-dyestuffs so obtained are then converted in the manner described above either into their ortho:ortho'-dihydroxy-azo-metal complexes or by way of the latter into the metal-free ortho:ortho'-dihydroxy-azo-dyestuffs. These reactions can be carried out in known manner, and there is is used as an agent yielding metal for example, an agent yielding nickel, but preferably an agent yielding copper.

The ortho:ortho'-dihydroxy-azo metal complexes contain a single metal atom bound in complex union per molecule of dyestuff. Consequently there must be no metal bound in complex union at the ortho-hydroxy-carboxylic acid grouping of the radical R₁. The complex compounds of this constitution can be obtained from the ortho-hydroxy-ortho'-alkoxy-azo-dyestuffs by metallization accompanied by dealkylation by using a proportion of the agent yielding metal corresponding to one atomic proportion of complex-forming metal per molecular proportion of dyestuff or at most a slight excess beyond this quantity of the agent yielding metal.

When a distinct excess of the agent yielding metal is used, for example, two atomic proportions of metal per molecular proportion of dyestuff, the ortho-hydroxy-carboxylic acid grouping in the radical R₁ is at least partially metallized. In this case, in order to prepare the desired complex metallized only at the ortho:ortho'-dihydroxy-azo-grouping the metal bound in complex union at the ortho-hydroxy-carboxylic acid grouping is subsequently split off. Such a partial demetallization can be carried out by heating the product in dilute hydrochloric acid, for example, hydrochloric acid of about 1 percent strength.

When the demetallization is carried out under energetic conditions, for example, with hydrochloric acid of higher concentration, or with an alkali cyanide or alkali sulfide, the metal-free ortho:ortho'dihydroxy-azo-dyestuff is obtained from the complex metal compound, whether the latter contains metal only at the ortho:ortho'-dihydroxy-azo grouping or whether it is metallized also at the ortho-hydroxy-carboxylic acid grouping.

For introducing a single metal atom bound in complex union per molecule of dyestuff and also for metallization at the ortho-hydroxy-ortho'-alkoxy-azo-grouping and at the ortho-hydroxy-carboxylic acid grouping, basically the same agents yielding metal can be used. However, the treatment with the agent yielding metal must in all cases be carried out in such manner that an ortho:ortho'-dihydroxy-azo-metal complex is formed accompanied by the splitting up of the alkoxy group bound to the radical R₃. For this purpose there are suitable, for example, agents yielding cobalt or nickel, but above all agents yielding copper. There come into consideration, for example, salts of divalent nickel, such as nickel sulfate, salts of monovalent or divalent copper, such as cuprous chloride or cupric sulfate, and also compounds which contain these metals in complex union. In the latter case there are especially suitable cuprammine complexes, for example, complex copper compounds obtainable from ammonia or an alkylamine, such as ethylamine, or ethanolamine, or morpholine, pyridine, a picoline or piperidine. In order to bring about the complete splitting off of the alkyl group from the alkoxy group with the formation of a metal complex of the trisazo-dyestuff, it is generally necessary to carry out the treatment with the agent yielding metal at a raised temperature, for example, at about 90° C., and for several hours. It is of advantage to work in an aqueous medium. If desired, the treatment with the agent yielding metal may be carried out in the presence of a suitable addition. As such additions there may be mentioned, bases such as ammonia or pyridine, for example, an excess of the base which is already present in the metal-ammine complex, when such a complex is used.

The ortho:ortho'-dihydroxy-azo-dyestuffs and complex metal compounds of this invention are suitable for dyeing a very wide variety of materials, for example, animal fiibers such as wool, silk or leather, but especially for dyeing or printing cellulose-containing materials, such as cotton, linen or artificial silk or staple fibers of regenerated cellulose. Level dyeings of good fastness to light are obtained with the complex metal compounds by the usual direct dyeing methods.

The metal-free dyestuffs, and also the complex metal compounds (the latter still containing the metal-free ortho-hydroxy-carboxylic acid grouping), are advantageously treated with an agent yielding metal on the fiber or partially on the fiber and partially in the dyebath by the known general methods. It is of advantage to use, for example, the process of U. S. Patent No. 2,148,659 in which there are carried out in the same bath first dyeing and then the treatment with the agent yielding metal. As agents yielding metal there come into consideration for this purpose, more especially, those which are stable towards alkaline solutions, such as complex copper tartrates.

In some cases especially valuable dyeings are obtained by working according to the process in which a dyeing or printing produced with the metal-free dyestuff is aftertreated with an aqueous solution which contains a basic formaldehyde condensation product of a compound containing the atomic grouping

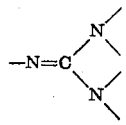

at least once in the molecule, for example, dicyandiamide or dicyandiamidine, or a compound, for example, cyanamide, easily convertible into a compound containing such an atomic group, and which solution also contains a water-soluble, more especially complex, copper compound. Such processes are described, for example, in British Patent No. 619,969.

The following examples illustrate the invention, the parts and percentages being by weight unless otherwise stated, and the relationship of parts by weight to parts by volume being the same as that of the kilogram to the liter:

*Example 1*

7.9 parts of the dyestuff of the formula

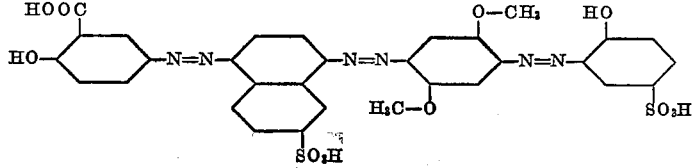

are dissolved in the form of the sodium salt with the aid of heat in 200 parts of water and 40 parts of pyridine. There is then added a coppering solution consisting of 2.5 parts of crystalline copper sulfate, 10 parts of water and 4 parts of ammonia solution of 24 percent strength, and the whole is stirred for about 5 hours at 90–95° C. The pyridine is then distilled off and the dystuff suspension is mixed with a quantity of hydrochloric acid such that the concentration of hydrochloric acid in the mixture is within the range of 0.7 to 1 percent. The whole is further stirred for a short time while hot, and the dyestuff is filtered off and washed on the filter with dilute sodium chloride solution. If desired, it is converted in known manner into its sodium salt. The latter is a dark powder which dissolves in concentrated sulfuric acid with a greenish blue coloration and in water with a dull violet-blue coloration. It dyes cotton from a bath containing sodium sulfate grey tints which are fast to light, and which when treated with copper salts become only slightly redder in shade and are of improved fastness to washing.

A dyestuff likewise yielding grey tints is obtained by using the trisazo-dyestuff of the formula

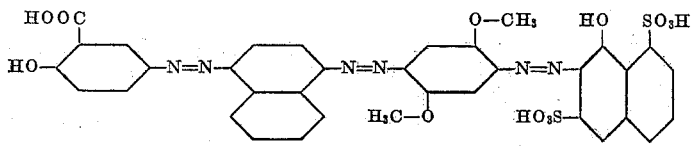

as starting material and treating it in a similar manner.

Example 2

7.9 parts of the trisazo-dyestuff of the formula

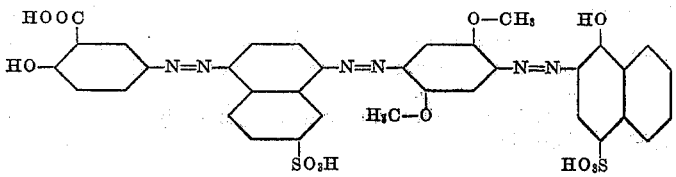

are dissolved in the form of the sodium salt in 300 parts of hot water with the addition of 2.2 parts of an ammonia solution of 24 percent strength. There is then added a coppering solution consisting of 5 parts of crystalline copper sulfate, 20 parts of water and 7.5 parts of an ammonia solution of 24 percent strength, and the whole is stirred for about 8 hours at 95° C. The mixture is then rendered weakly acid to Congo by the addition of about 14 parts of hydrochloric acid of 30 percent strength, and a further quantity of hydrochloric acid is added such that the concentration of hydrochloric acid in the mixture is about 0.7 percent, and the whole is stirred for 2 hours at 90–95° C. The precipitated dyestuff is filtered off and washed on the filter with dilute sodium chloride solution until the filtrate is free from copper. By stirring the product with sodium chloride solution of 15 percent strength and reacting with sodium carbonate the sodium salt is prepared. The latter, when dry, is a dark powder which dissolves in concentrated sulfuric acid with a blackish blue coloration and in water with a blue coloration, and dyes cotton grey tints which are fast to light, and which when after-treated with copper salts become somewhat redder in shade and possess a very good fastness to washing.

Practically the same dyestuff is obtained by using only 1 molecular proportion of copper sulfate per molecular proportion of trisazo-dyestuff. In this case the mixture is rendered acid to Congo with hydrochloric acid when the coppering is finished, the precipitated copper compound is filtered off after cooling and, if desired, converted into its sodium salt.

Alternatively, after the reaction with the copper salt, the dyestuff can easily be completely demetalized, for example, by treatment with hydrochloric acid of higher concentration. The metal-free dyestuff yields dyeings of lower fastness, but they are fast to washing and light after being treated with a copper salt and correspond in their properties to the dyeings described in the first paragraph of this example.

Example 3

3.9 parts of the monoazo-dyestuff from diazotized 1-amino-4-hydroxybenzene-3-carboxylic acid and 1-aminonaphthalene-7-sulfonic acid are converted into a disazo-dyestuff in known manner by diazotization and coupling with 1-amino-2-methoxy-5-methylbenzene, and then into a trisazo-dyestuff by further diazotization and coupling with 1-hydroxynaphthalene-4-sulfonic acid. The dyestuff so obtained and having the formula

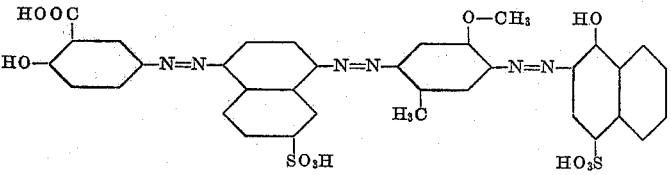

is dissolved in 300 parts of hot water with the addition of 5 parts of ammonia solution of 24 percent strength. There is then added an ammoniacal solution of copper oxide consisting of 2.5 parts of crystalline copper sulfate, 10 parts of water and 4 parts of ammonia solution of 24 percent strength, and the whole is stirred for 18–24 hours at 95° C. The mixture is then rendered weakly acid to Congo with hydrochloric acid, an excess of 7.5 parts of hydrochloric acid of 30 percent strength is then added, and stirring is continued for a further 1 to 2 hours, while hot. The completely precipitated dyestuff is filtered off, washed with dilute sodium chloride solution and, if desired, converted into the sodium salt. When dry, it is a dark powder which dissolves in concentrated sulfuric acid and in water with a dull violet coloration and yields on cotton grey tints which are fast to light, and which when treated with a copper salt become somewhat redder in shade and have an improved fastness to washing.

Example 4

100 parts of cotton are entered at 40° C. into a dyebath which contains in 3000 parts of water 1 part of the dyestuff obtained as described in the first paragraph of Example 1 and containing one atom of copper bound in complex union per molecule of dyestuff. The temperature is raised in the course of 30 minutes to 90–95° C., 30 parts of crystalline sodium sulfate are added and dyeing is carried on for ½ hour at 90–95° C. The cotton is then rinsed with cold water and dried. It is dyed a grey tint of good fastness to light.

*Example 5*

100 parts of cotton are entered at 50° C. into a dyebath which contains in 4000 parts of water 2 parts of anhydrous sodium carbonate and 1 part of the dyestuff obtained as described in the first paragraph of Example 2 and containing 1 atom of copper bound in complex union per molecule of dyestuff, or 2 parts of the dyestuff obtained as described in the last paragraph of Example 2 and free from metal bound in complex union. The temperature is increased in the course of 20 minutes to 90–95° C., 40 parts of crystalline sodium sulfate are added, and dyeing is carried on for ¾–1 hour at 90–95° C. The dyeing is then rinsed in cold water and treated for 20–30 minutes at 60–70° C. in a bath containing in 4000 parts of water 3 parts of acetic acid of 40 percent strength and 3 parts of crystalline copper sulfate. Finally the dyeing is rinsed in the cold and dried. There is obtained a grey dyeing of good fastness to light and washing.

What is claimed is:

1. A dyestuff selected from the group consisting of an ortho:ortho′-dihydroxyazo dyestuff and the ortho:ortho′-dihydroxyazo copper complex of such dyestuff containing a single complex bound copper atom in the dyestuff molecule, the dyestuff corresponding to the formula $$R_1-N=N-R_2-N=N-R_3-N=N-R_4$$

in which $R_1$ represents a benzene radical containing in para-position to the azo linkage a hydroxyl group and in ortho-position to the latter group a carboxylic acid group, $R_2$ represents a naphthalene radical bound in para-position to the azo linkages, $R_3$ represents a benzene radical bound in para-position to the azo linkages and containing in ortho-position to the $-N=N-R_4$ group a hydroxyl group and $R_4$ represents a naphthalene radical containing in a position vicinal to the azo linkage a hydroxyl group as the sole auxochromic group and also containing at least one sulfonic acid group.

2. A dyestuff selected from the group consisting of an ortho-ortho′-dihydroxyazo dyestuff and the ortho:ortho′-dihydroxyazo copper complex of such dyestuff containing a single complex bound copper atom in the dyestuff molecule, the dyestuff corresponding to the formula $$R_1-N=N-R_2-N=N-R_3-N=$$
$$N-C_{10}H_{6-n}(SO_3H)_nOH$$

in which $R_1$ represents a benzene radical containing in  para-position to the azo linkage a hydroxyl group and in ortho-position to the latter group a carboxylic acid group, $R_2$ represents a naphthalene radical bound in para-position to the azo linkages, $R_3$ represents a benzene radical bound in para-position to the azo linkages and containing in ortho-position to the $-N=N-C_{10}$-group a hydroxyl group, and $-C_{10}H_{6-n}(SO_3H)_nOH$ represents the radical of a hydroxynaphthalene sulfonic acid bound to the azo linkage in a position vicinal to the HO-group, $n$ denoting a whole number of at the most 2.

3. An ortho:ortho′-dihydroxyazo dyestuff of the formula

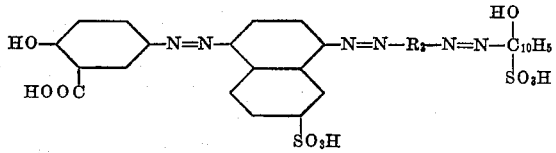

in which $R_3$ represents a benzene radical bound in para-position to the azo linkages and containing in ortho-position to the $-N=N-C_{10}$-group a hydroxyl group and

represents the radical of a hydroxynaphthalene monosulfonic acid bound to the azo linkage in a position vicinal to the HO-group.

4. A complex copper compound corresponding to the formula

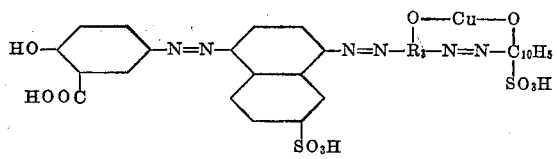

in which $R_3$ represents a benzene radical bound in para-position to the azo linkages and to the $-O-Cu$-group in ortho-position to the $-N=N-C_{10}$-group and

represents the radical of a naphthalene monosulfonic acid bound to the azo linkage in a position vicinal to the $-Cu-O$-group.

5. The ortho:ortho′-dihydroxyazo dyestuff of the formula

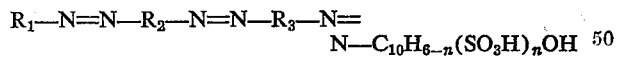

6. The complex copper compound of the formula

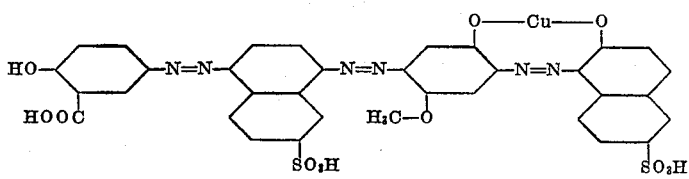

7. The complex copper compound of the formula

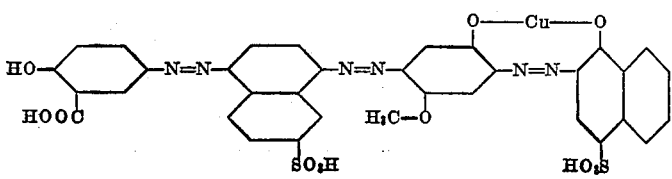

8. The complex copper compound of the formula
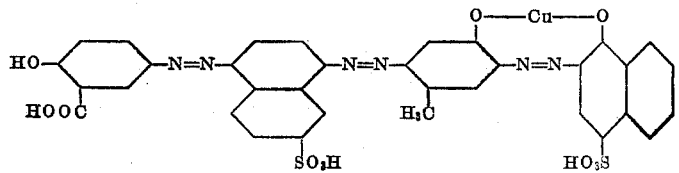
References Cited in the file of this patent
UNITED STATES PATENTS
2,737,510 Ischer et al. _____ Mar. 6, 1956
2,769,805 Hanhart _____ Nov. 6, 1956
FOREIGN PATENTS
222,797 Switzerland _____ Sept. 1, 1943
248,708 Switzerland _____ Feb. 16, 1948
258,587 Switzerland _____ Feb. 1, 1950